(12) United States Patent
Heldberg

(10) Patent No.: US 10,683,948 B2
(45) Date of Patent: Jun. 16, 2020

(54) THERMOSTAT VALVE AND METHOD FOR OPERATING A THERMOSTAT VALVE

(71) Applicant: ILLINOIS TOOL WORKS INC., Glenview, IL (US)

(72) Inventor: Carsten Heldberg, Kirchlinteln (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/502,564

(22) PCT Filed: Jun. 13, 2015

(86) PCT No.: PCT/US2015/035711
§ 371 (c)(1),
(2) Date: Feb. 8, 2017

(87) PCT Pub. No.: WO2016/025069
PCT Pub. Date: Feb. 18, 2016

(65) Prior Publication Data
US 2017/0363223 A1    Dec. 21, 2017

(30) Foreign Application Priority Data

Aug. 15, 2014 (DE) .......................... 10 2014 111 686

(51) Int. Cl.
*F16K 31/165* (2006.01)
*F16K 5/06* (2006.01)
(Continued)

(52) U.S. Cl.
CPC ........ *F16K 31/1655* (2013.01); *F16K 5/0605* (2013.01); *F16K 5/0647* (2013.01);
(Continued)

(58) Field of Classification Search
CPC ...... F16K 31/002; F16K 31/06; F16K 31/605; F16K 31/1221; F16K 27/0245; F16K 5/10; F16K 5/0605; F16K 5/0647; F16K 5/18
(Continued)

(56) References Cited

U.S. PATENT DOCUMENTS 3,653,406 A  *  4/1972 Racki ..................... B60T 15/54
                                                137/599.18
4,073,465 A  *  2/1978 Sheppard ................. F16K 1/22
                                                        251/58
(Continued)

FOREIGN PATENT DOCUMENTS

CN        102449357 A       5/2012
DE      102006038213 A1     2/2008
(Continued)

OTHER PUBLICATIONS

ISR & WO for PCT/US2015/035711 dated Sep. 24, 2015.

*Primary Examiner* — Matthew W Jellett
(74) *Attorney, Agent, or Firm* — Pilloff Passino & Cosenza LLP; Martin J. Cosenza

(57) ABSTRACT

A thermostat valve for an internal combustion engine includes a housing with several cooling liquid connections and a drive which drives in rotation a hollow valve element mounted rotationally in the housing, by exerting a drive force, wherein the valve element has several openings delimited by its circumferential face which can be brought selectively in congruence with one or more of the cooling liquid connections of the housing by rotation of the valve element for the throughflow of cooling liquid.

20 Claims, 6 Drawing Sheets

Figure 1:
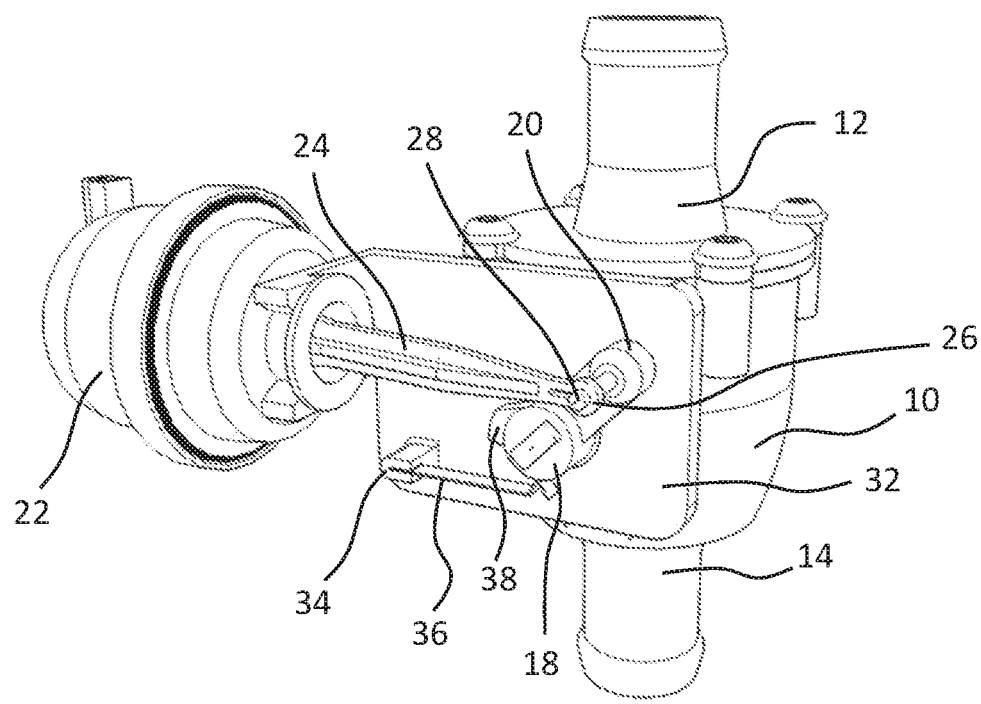

(51) Int. Cl.
   *F16K 5/12*     (2006.01)
   *F16K 31/122*   (2006.01)
   *F01P 7/14*     (2006.01)
   *F16K 31/00*    (2006.01)

(52) U.S. Cl.
   CPC ............ *F16K 5/12* (2013.01); *F16K 31/1221* (2013.01); *F01P 2007/146* (2013.01); *F01P 2070/06* (2013.01); *F16K 31/002* (2013.01); *F16K 31/1223* (2013.01)

(58) Field of Classification Search
   USPC .......... 251/11, 63.4, 74, 207, 208, 288, 297
   See application file for complete search history.

(56) References Cited

U.S. PATENT DOCUMENTS

| | | | | |
|---|---|---|---|---|
| 4,164,234 A | * | 8/1979 | Liepert | B65H 3/48 137/51 |
| 4,299,373 A | * | 11/1981 | Troyer | F16K 1/221 251/279 |
| 5,524,863 A | * | 6/1996 | Davis | B08B 9/00 137/625.32 |
| 7,963,455 B2 | * | 6/2011 | Heldberg | F16K 31/002 123/41.08 |
| 8,820,709 B2 | * | 9/2014 | Lombard | F01D 17/105 123/559.1 |
| 2012/0080629 A1 | | 4/2012 | Rogge et al. | |
| 2014/0264122 A1 | * | 9/2014 | Bolanahalli | F16K 3/04 251/301 |
| 2015/0123023 A1 | | 5/2015 | Heldberg | |
| 2015/0286224 A1 | | 10/2015 | Bartonek | |

FOREIGN PATENT DOCUMENTS

| | | | |
|---|---|---|---|
| DE | 102010008740 A1 * | 8/2011 | ............ F02D 9/101 |
| EP | 0525376 A1 | 2/1993 | |
| FR | 2839164 A1 | 10/2003 | |
| WO | 2014011922 A1 | 1/2014 | |
| WO | 2014078255 A2 | 5/2014 | |

* cited by examiner

THERMOSTAT VALVE AND METHOD FOR OPERATING A THERMOSTAT VALVE

RELATED APPLICATIONS

The present application is a National Phase of International Application Number PCT/US2015/035711 filed Jun. 13, 2015, and claims priority to German Application Number 10 2014 111 686.0 filed Aug. 15, 2014.

The invention relates to a thermostat valve for an internal combustion engine, comprising a housing with a plurality of cooling liquid connections and a drive which drives a hollow valve element, which is mounted rotatably in the housing, rotationally by way of the exertion of a drive force, wherein the valve element has several openings which are delimited by its circumferential face and which can be brought into congruence selectively with one or more of the cooling liquid connections of the housing for the throughflow of cooling liquid by way of rotation of the valve element. The invention furthermore relates to a method for operating one such thermostat valve.

Thermostat valves are used in automobiles for regulating the temperature of the internal combustion engine. A thermostat valve is known by way of example from DE 10 2006 038 213 B4. In order to reach the operating temperature as fast as possible it is known to circulate the cooling liquid during the warm-up phase of the internal combustion engine through a bypass pipe surrounding the radiator. However in such a position of the thermostat valve cooling liquid also flows through the internal combustion engine and slows down the warming up of the internal combustion engine. In order to reach the operating temperature even faster it has therefore already been proposed to completely interrupt the throughflow of cooling liquid through the internal combustion engine in the warm-up phase.

The drawback with a complete interruption of the cooling liquid throughflow is however that after a certain time locally very hot zones can arise in the internal combustion engine, so-called hotspots. This can lead to damage. Furthermore as a result of the stationary cooling liquid the actual temperature of the internal combustion engine can no longer be reliably measured via a cooling liquid temperature sensor. In order to avoid these problems therefore in the case of the known thermostat valves the cooling liquid throughflow through the internal combustion engine has to be already reactivated long before the internal combustion engine has actually reached its operating temperature. The consumption- and emissions-intensive warming up phase is thereby lengthened.

Starting from the prior art already explained, the invention is concerned with the problem of providing a thermostat valve and a method of the type mentioned at the beginning with which by avoiding the problems mentioned above it is possible to minimize the warming-up phase of the internal combustion engine.

The invention solves the problem by the subjects of the independent claims 1 and 13. Advantageous configurations are found in the dependent claims, the description and the figures.

For a thermostat valve of the type mentioned at the beginning the invention solves the problem in that
adjacently with respect to one of the openings the circumferential face of the valve element has a depression or a cutout,
the valve element can assume a connecting position, a closed position and an intermediate position between the connecting position and the closed position, wherein the relevant opening is in congruence with one of the cooling liquid connections of the housing in the connecting position, and a cooling liquid flow is possible between the interior of the valve element and the relevant cooling liquid connection, wherein the relevant opening is not in congruence with the relevant cooling liquid connection of the housing in the closed position, and a cooling liquid flow is not possible between the interior of the valve element and the relevant cooling liquid connection, and wherein the relevant opening is likewise not in congruence with the relevant cooling liquid connection of the housing in the intermediate position, a cooling liquid flow being possible between the interior of the valve element and the relevant cooling liquid connection however through the depression or the cutout,
the intermediate position is defined by a stop element which is prestressed into a blocked position and against which the valve element moves with an actuating section in the case of a drive force which does not exceed a limit force, wherein the stop element is moved counter to its prestress by the actuating section of the valve element by way of the exertion of a drive force which exceeds the limit force into a released position in which the valve element can be moved with its actuating section past the stop element in order to leave the intermediate position.

The internal combustion engine is more particularly the internal combustion engine of an automobile. The invention thus also relates to an internal combustion engine of an automobile comprising a thermostat valve according to the invention. The housing of the thermostat valve according to the invention can comprise by way of example two cooling liquid connections of which one leads to the internal combustion engine and one leads to a radiator. It is also possible that the housing has a third cooling liquid connection which leads by way of example to a bypass pipe surrounding the cooler. The valve element can have a spherical segment shaped circumferential face. It can form a half shell. The basic construction and the basic function of one such thermostat valve are known per se.

According to the invention the circumferential face of the valve element has a depression or a cutout adjoining one of the openings. The depression or the cutout communicates correspondingly with the opening. The valve element according to the invention can furthermore occupy an intermediate position lying between the closed position and the connecting position. In the connecting position more particularly a complete congruence of the relevant opening of the valve element with the relevant cooling liquid connection can exist, thus a maximum cooling liquid throughflow can be enabled. In the closed position one such cooling liquid throughflow between the interior of the hollow valve element and the cooling liquid connection or between the cooling liquid connections of the housing is correspondingly completely interrupted. The cooling liquid connection which is closed in the closed position by the valve element can correspondingly be the cooling liquid connection leading to the internal combustion engine. In the intermediate position a cooling liquid throughflow takes place more particularly only through the cutout adjoining the relevant opening or the depression adjoining the relevant opening. Correspondingly in this intermediate position only a significantly smaller cooling liquid throughflow is possible than in the connecting position. By way of example in the intermediate position a cooling liquid throughflow can be possible which is less than 5%, preferably less than 3% of the cooling liquid throughflow in the connecting position.

The intermediate position is defined according to the invention by the stop element which is prestressed into the blocked position. More particularly vacuum drives having so-called vacuum diaphragm units cannot as a rule reliably hold intermediate positions between two end positions. This problem is solved according to the invention by the stop element which is prestressed into the blocked position. If the valve element is rotated by the drive with a drive force below a predetermined limit force, by way of example from the connecting position into the closed position, the actuating section of the valve element blocks on the stop element located in the blocked position so that the valve element cannot be rotated beyond the intermediate position. The valve element is thereby held defined in the intermediate position. Only by exerting a drive force through the drive which exceeds the predetermined limit force can the stop element be pressed by the actuating section of the valve element against the prestress of the stop element into a released position and the actuating section and thus the valve element can be rotated past the stop element, by way of example into the closed position.

In the warm-up phase of the internal combustion engine it is therefore possible with the thermostat valve according to the invention to introduce, after a certain time of the complete switch-off of the cooling liquid throughflow, a further stage which ensures via the cutout or the depression a very small but defined cooling liquid flow through the internal combustion engine. A provision of the complete cooling liquid throughflow which is clearly later when compared with the prior art is hereby possible again since the cooling liquid throughflow which is permitted in the intermediate position avoids the hotspots previously mentioned and at the same time the temperature of the internal combustion engine can be reliably determined using the cooling liquid flow which is flowing through the internal combustion engine in the intermediate position. The warm-up phase of the internal combustion engine can thus be shortened and the fuel consumption and emissions of the internal combustion engine can be minimized. If a vacuum drive is used by way of example as the drive it is possible by means of an electrically adjustable vacuum valve to adjust the vacuum generated each time so that the drive force exerted by the drive falls short of or exceeds the limit force. By providing the stop element a third valve position is thus defined between the connecting position and the closed position, namely the intermediate position, and reached without a position control of the drive. A position control is just difficult in the case of vacuum drives and leads to permanent position changes of the valve element.

As opposed to providing a depression or a cutout by way of example in the housing of the valve element adjoining the cooling liquid connection, the provision of the depression or the cutout in the moved valve element has a further advantage. A self-cleaning of the depression or the cutout thus takes place by passing over the cooling liquid connection during the course of the rotation of the valve element. By providing by way of example a small hole in a static part of the thermostat valve there is the fundamental risk of contamination, which according to the invention is avoided by providing the cutout or the depression in a movable part. In this respect a channel-like or trench-like depression has proved particularly suitable. This offers a constant outflow cross-section, even with the occurrence of small position changes of the valve element. A particularly effective self-cleaning furthermore takes place here.

According to one configuration it can be proposed that the movement of the stop element counter to its prestress into the released position is effected by the actuating section of the valve element by way of the exertion of the drive force which exceeds the limit force during the course of a rotation of the valve element from the intermediate position into the closed position. It can be proposed in particular that the stop element or its prestress is designed so that exceeding the limit force by the drive force is only necessary when the valve element is to be rotated beyond the intermediate position into the closed position, but not however in the opposite direction. This has the advantage that the rotation of the valve element into the connecting position (fail-safe) which is required in the event of a failure of the drive, is possible without having to overcome the limit force.

The connecting position and the closed position of the valve element can each be defined by an end stop. This can also be an end stop of the drive.

The stop element can be more particularly spring-prestressed into the blocked position. Thus the stop element can be an elastic spring arm fixedly clamped by its one end wherein the actuating section in the blocked position moves against the free end of the spring arm which is opposite the fixedly clamped end. At its free end the spring arm can have a bent section, preferably a section bent with a V-shaped cross-section, against which the actuating section moves on reaching the intermediate position. If for diagnostic purpose (on-board diagnostics OBD) an end position recognition is required, then the detent function of the stop element can also be formed by a (resilient) actuating lever of a micro switch. If on the other hand no end position recognition is required, then the stop element can be formed in a particularly simple manner by a plastics arm designed as a spring arm which is moulded on the housing of the thermostat valve. Alternatively a spring arm is also conceivable made of spring steel.

The actuating section can be an actuating projection formed on the outer side of the valve element. The actuating section can be formed at one end of a shaft which supports the valve element in rotation.

According to a further development the valve element can be prestressed by spring prestress into the connecting position so that the valve element occupies the connecting position in the event of failure of the drive. As already mentioned, it is possible that the stop element requires a higher drive force than the limit force in order to be overcome during movement of the valve element into the closed position. In order to prevent an overheating of the internal combustion engine (fail-safe) in the event of a failure of the drive, the drive can be prestressed by way of example by a resetting spring so that after a sharp reduction or complete failure of the vacuum applied the valve element is rotated into the connecting position. In order to facilitate the fail-safe function it can be proposed that the stop element during rotation of the valve element into the connecting position produces only a very slight additional resistance, by way of example only the sliding friction of a stop element formed as a spring arm on the actuating section of the valve element. In this way a secure valve opening is guaranteed by the resetting spring at any time.

The drive can be a linear drive which engages eccentrically on a shaft which mounts the valve element rotationally. The shaft which mounts the valve element rotationally in the housing of the thermostat valve can be formed integral with the remaining valve element. The drive can be a vacuum drive or an electric drive. By way of example when using a vacuum drive the drive draws the valve element down from a certain low pressure (for example ⅓ of a maximum low pressure) into the closed position. The valve element is rotated into the intermediate position up to a second low pressure (for example ⅔ of a maximum low pressure). Only when a third low pressure is reached, by way of example 85% of a maximum low pressure, is the valve element rotated into the closed position. The vacuum drive can comprise by way of example a vacuum diaphragm unit, wherein an electrically controllable vacuum valve is used for providing the variable vacuum ("electrical variable vacuum control valve eVVCV").

At least one of the cooling liquid connections of the housing can have sealing means bearing against the circumferential faces of the valve element. The sealing means can comprise at least one sliding ring as well as at least one elastic sealing ring which prestresses the sliding ring against the circumferential face of the valve element.

The invention furthermore solves the problem by a method for operating a thermostat valve according to one of the preceding claims characterised by the steps:

rotating of the valve element out of the connecting position into the closed position by way of a drive force which exceeds the limit force wherein the valve element is moved with its actuating section past the stop element with the movement of the stop element counter to its prestress into its released position, subsequent rotating of the valve element back out of the closed position beyond the intermediate position as far as into a position in which the relevant opening of the valve element is in partial congruence with the relevant cooling liquid connection of the housing and a cooling liquid flow is possible between the interior of the valve element and the relevant cooling liquid connection, subsequent rotating of the valve element back into the intermediate position by way of a drive force which does not exceed the limit force so that a cooling liquid flow takes place between the interior of the valve element and the relevant cooling liquid connection through the depression or the cutout.

The rotation of the valve element back out of the closed position beyond the intermediate position can likewise take place in particular with a drive force which exceeds the limit force. This is however not absolutely necessary, as explained above. The partial congruence between the relevant opening and the relevant cooling liquid connection can be for example a roughly half congruence. In this valve position it results accordingly in a partial, for example roughly half, cooling liquid throughflow. This position is indeed not held by the valve element but only forms the change-over point when changing the rotational direction of the valve element. The temporary rotation of the valve element back into the position guaranteeing a, by way of example roughly half, congruence between the relevant opening and the relevant cooling liquid connection, has the advantage that the cooling liquid existing up to then in the internal combustion engine is moved temporarily in a manner similar to in the case of rinsing so that temperature inhomogeneities are for the most part avoided. The subsequent small cooling liquid throughflow in the intermediate position is then in each case sufficient to avoid harmful hotspots by way of example on the cylinder sleeves of the internal combustion engine. The valve element can then be rotated back into the connecting position from the intermediate position.

Figure 2:
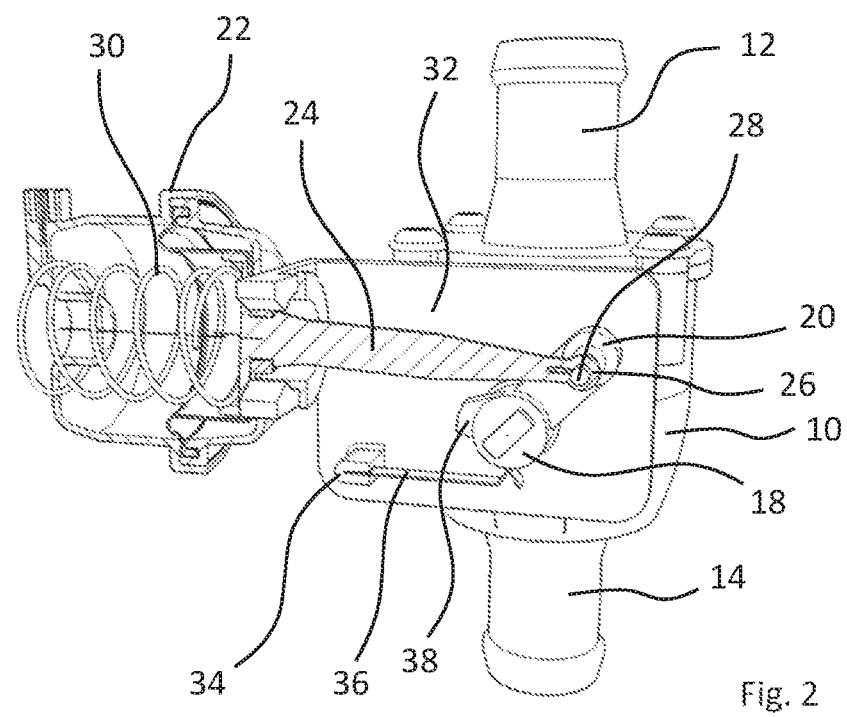
Figure 3:
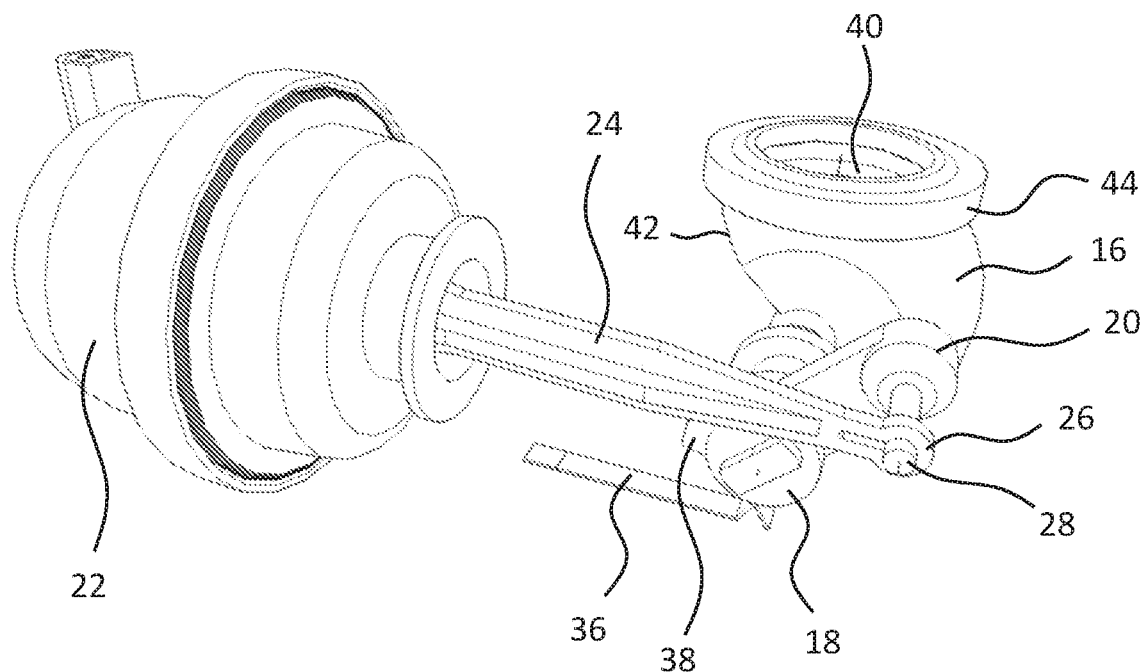
Figure 4:
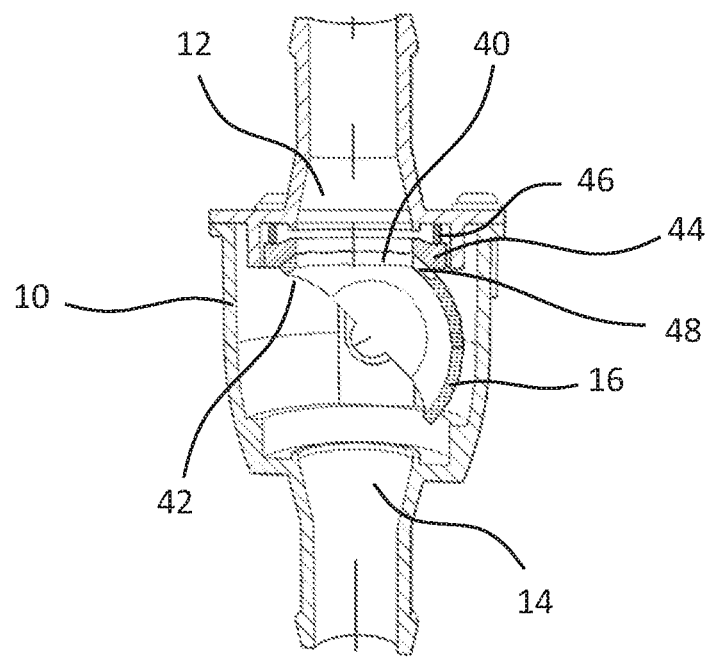
Figure 5:
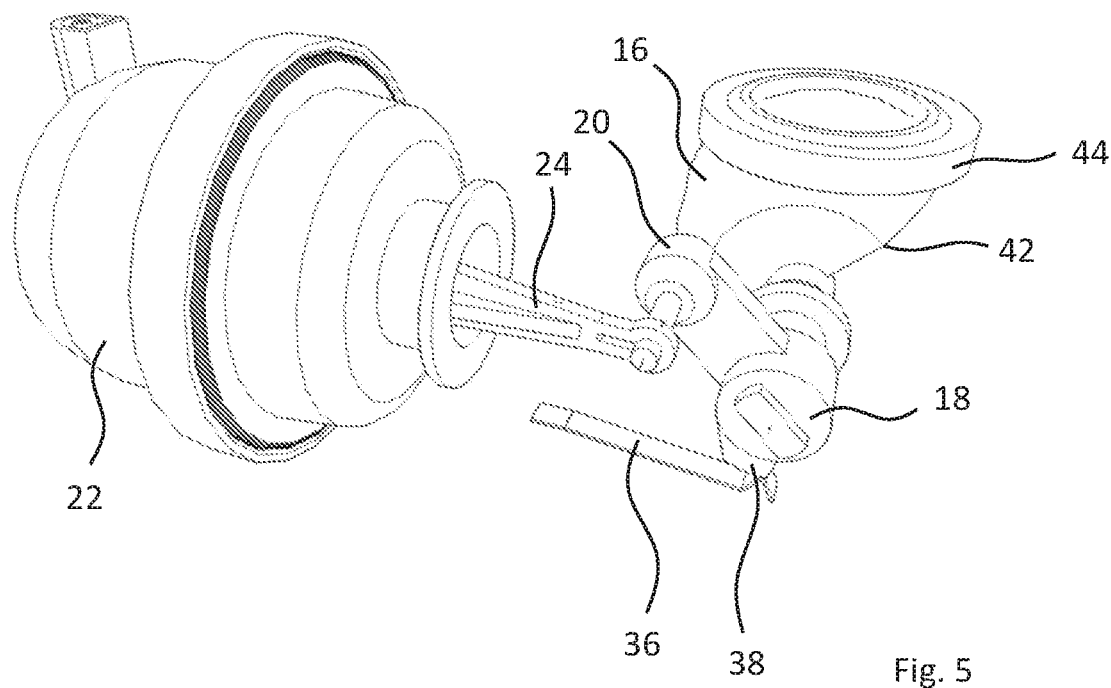
Figure 6:
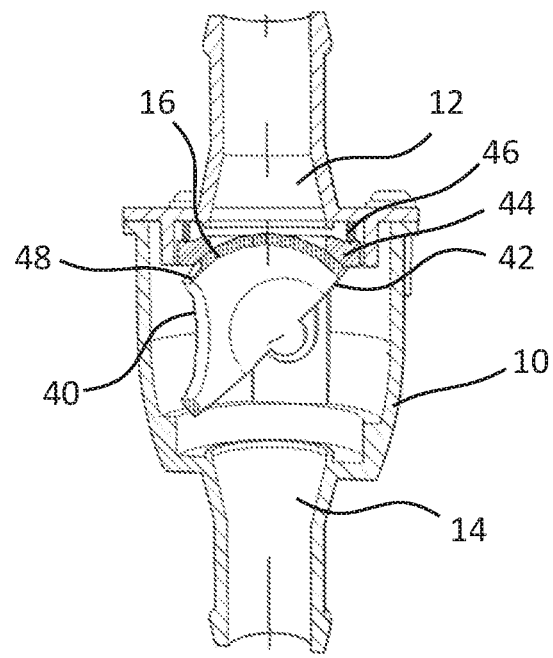
Figure 7:
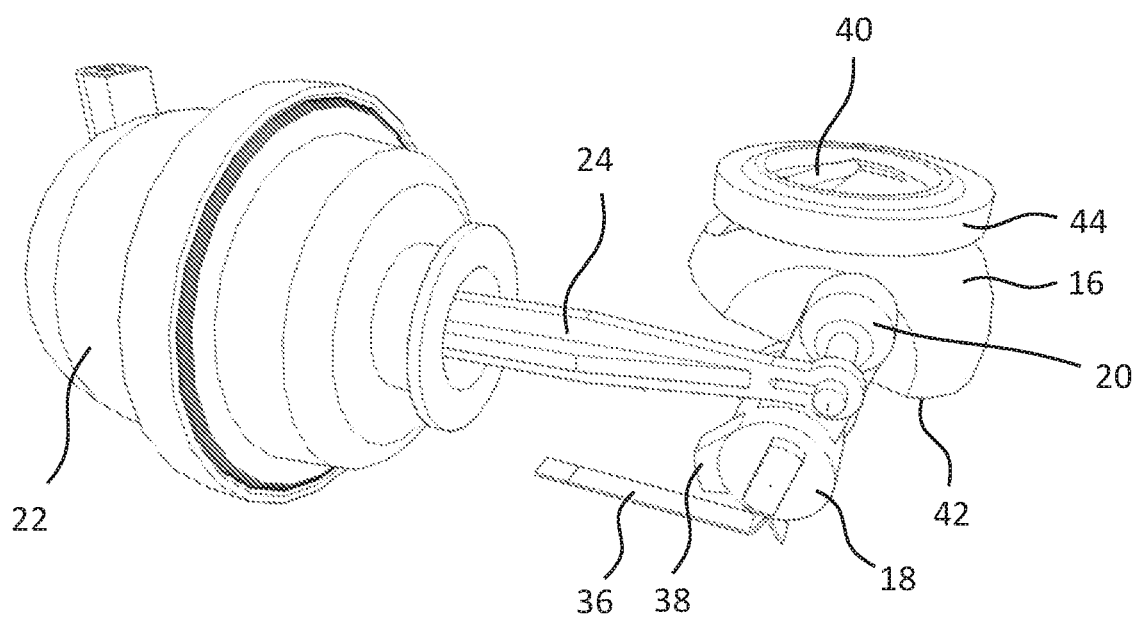
Figure 8:
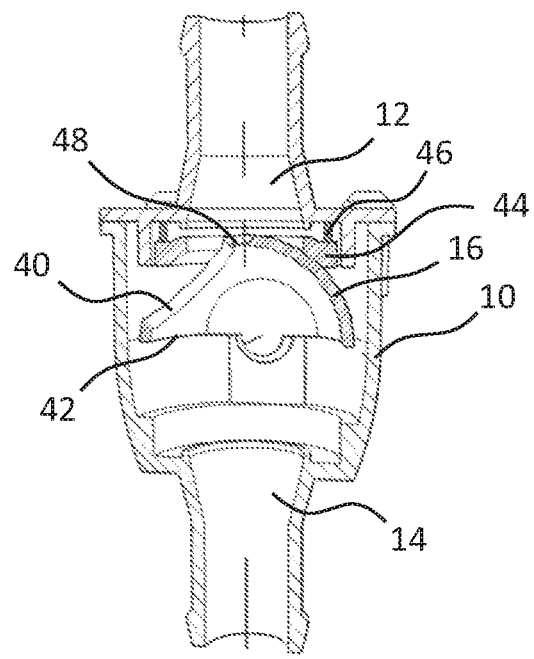
Figure 9:
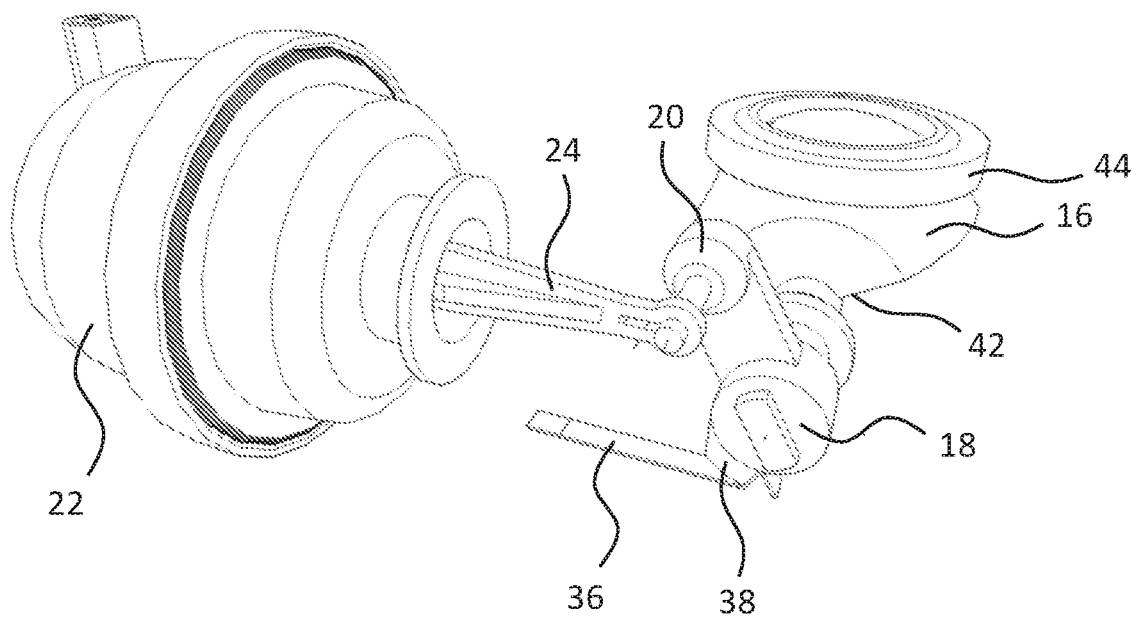
Figure 10:
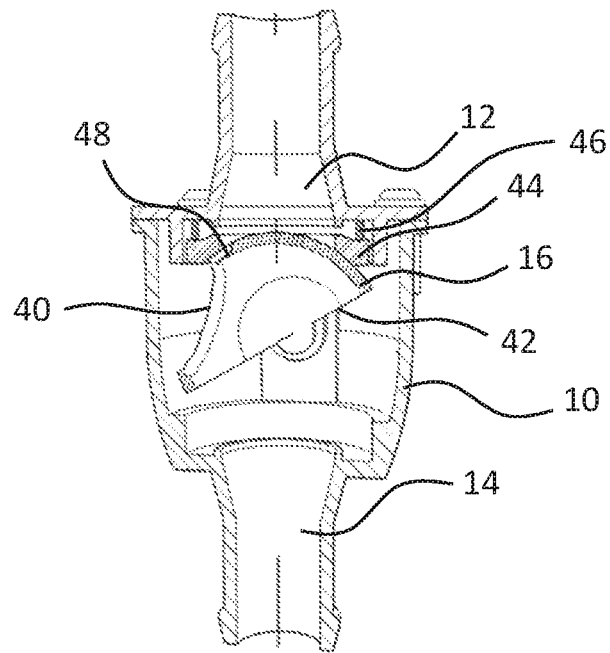
Figure 11:
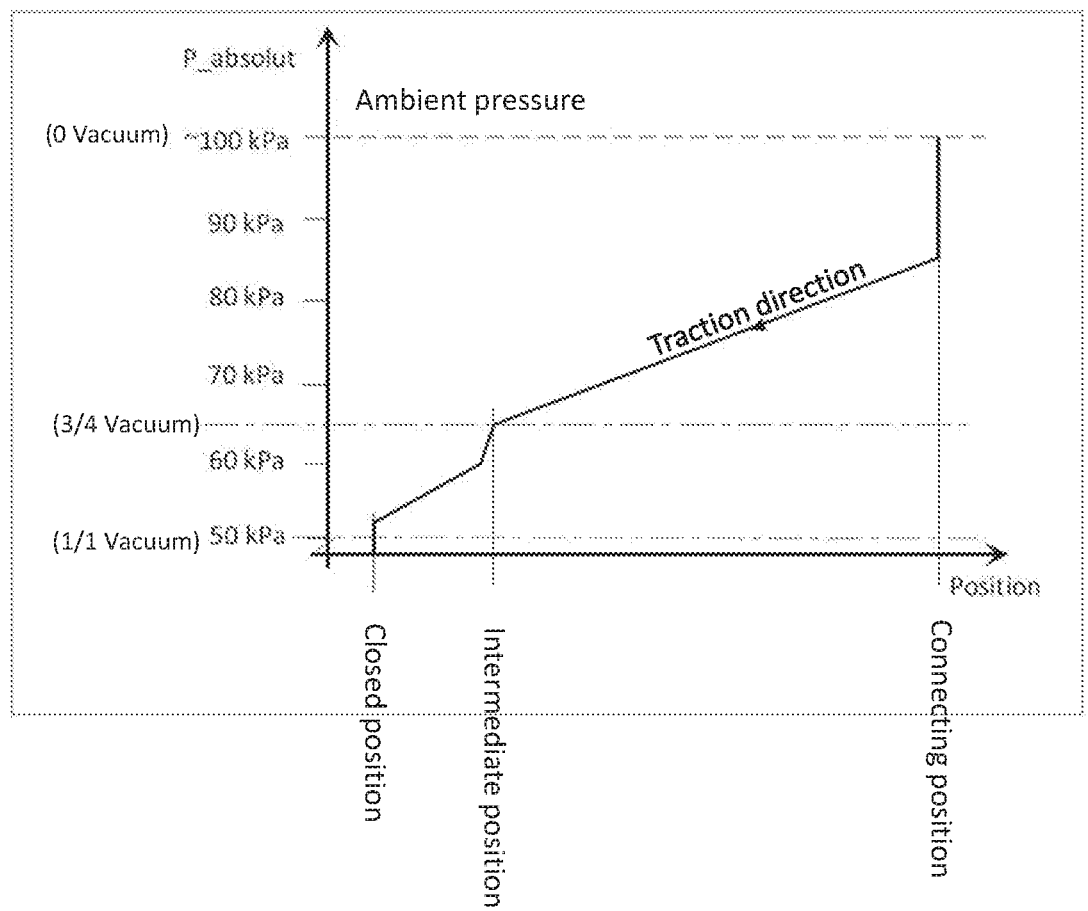

An embodiment of the invention will now be explained in further detail below with reference to the drawings. These show diagrammatically:

FIG. 1 a thermostat valve according to the invention in a perspective view;

FIG. 2 the thermostat valve of FIG. 1 in a sectional view;

FIG. 3 a part of the thermostat valve shown in FIG. 1 in a first operating position in a perspective view;

FIG. 4 a cross-sectional view through the thermostat valve in the operating position shown in FIG. 3;

FIG. 5 a part of the thermostat valve shown in FIG. 1 in a second operating position in a perspective view;

FIG. 6 a cross-sectional view through the thermostat valve according to the invention in the operating position illustrated in FIG. 5;

FIG. 7 a part of the thermostat valve illustrated in FIG. 1 in a third operating position in a perspective view;

FIG. 8 a cross-sectional view through the thermostat valve according to the invention in the operating position illustrated in FIG. 7;

FIG. 9 a part of the thermostat valve illustrated in FIG. 1 in a fourth operating position in a perspective view;

FIG. 10 a cross-sectional view through the thermostat valve according to the invention in the operating position illustrated in FIG. 9, and FIG. 11 a flow chart for illustrating the mode of operation of the drive of the thermostat valve according to the invention.

Unless stated otherwise, the same reference numerals in the figures designate the same objects. The thermostat valve according to the invention illustrated in FIGS. 1 and 2 serves for the temperature regulation of an internal combustion engine (not shown) of an automobile. The thermostat valve has a housing 10 with a first cooling liquid connection 12 and a second cooling liquid connection 14. The first cooling liquid connection 12 is connected in operation by way of example to cooling channels which run through the internal combustion engine and the second cooling liquid connection 14 is connected during operation by way of example to a radiator. A hollow spherical segment shaped valve element 16 which is designed as a half shell and is shown in FIGS. 3 to 10 is rotationally mounted in the housing 10 by way of a shaft 18. A drive which is here formed as a vacuum drive 22 engages via a drive rod 24 on the shaft 18 eccentrically by way of an eccentric section 20. The drive rod 24 has at its end an articulation section 26 which is mounted for articulation on a bearing pin 28 of the eccentric section 20. A translation movement of the drive rod 24 can be converted by this coupling into a rotational movement of the shaft 18 and thus of the valve element 16 in the housing 10. The vacuum drive 22 generates an adjustable low pressure, such as will be explained in further detail below, through which the drive rod 24 is drawn into the housing of the vacuum drive 22 against the prestress of a resetting spring 30 shown in FIG. 2 and with compression of the resetting spring 30. If the low pressure drops sharply or the vacuum drive fails then the resetting spring 30 presses the drive rod 24 out from the housing of the vacuum drive 22 into the connecting position which is shown in FIGS. 1 and 2 and which will be explained in further detail below.

An elastic spring arm 36 which can be made by way of example of spring steel is fixedly clamped by its one end in a clamp 34 on a holding plate 32 which is formed on the housing 10 of the thermostat valve. The spring arm 36 forms a stop element. The opposite end of the spring arm 36 is free and is bent in a V-shape in cross-section. The position illustrated in FIGS. 1 and 2 is the blocked position of the spring arm 36. An actuating section which is formed as an actuating projection 38 is moulded on the shaft 18. The actuating projection 38 interacts with the spring arm 36 in the manner which will be explained in further detail below.

Different operating positions of the thermostat valve according to the invention are to be explained using FIGS. 3 to 10. FIGS. 3 and 4 show the connecting position illustrated in FIGS. 1 and 2 and which at the same time is the fail-safe position adopted in the event of a failure of the vacuum drive 22. In this position the drive arm 24 is located in its widest extended position. It can be seen in FIGS. 3 and 4 that the spherical segment shaped valve element 16 has a first opening 40 delimited by its circumferential face and a larger second opening 42 likewise delimited by its circumferential face. The second opening 42 is formed by the open region of the half shell. It should be pointed out that in FIGS. 3, 5, 7 and 9 for reasons of clarity the housing 10 of the thermostat valve including the clamping of the spring arm 36 is not shown. However sealing means of the first cooling liquid connection 12 can be seen in FIGS. 3 to 10, and here comprise a sliding ring 44 adapted to the circumferential face of the valve element 16, as well as an elastic sealing ring 46 which prestresses the sliding ring 44 against the circumferential face of the valve element 16. As can be seen in particular in the sectional illustration in FIG. 4, in the connecting position adopted in FIGS. 3 and 4 the opening 40 of the valve element 26 is in complete congruence with the first cooling liquid connection 12. In this connecting position a maximum cooling liquid throughflow between the cooling liquid connections 14, 12 is possible through the valve element 16. It can furthermore be seen that the circumferential face of the valve element 16 adjoining the smaller opening 40 has a channel-like or trench-like depression 48.

By applying a high vacuum through the vacuum drive 22 and a drive force by the drive rod 24 which is caused thereby and exceeds a predetermined limit force, the eccentric section 20 can be drawn from the connecting position illustrated in FIGS. 3 and 4 into the closing position of the valve element 16 shown in FIGS. 5 and 6. This drive force must be recognisably large enough so that the actuating projection 38 can press the spring arm 36 against its spring prestress from the blocked position into the free position illustrated in FIG. 5 in which the actuating projection 38 can pass by the spring arm 36, more particularly the V-shaped bent free end of the spring arm 36. In this position of the valve element 16 the first cooling liquid connection 12 of the housing 10 is closed completely by the circumferential face of the valve element 16, as can be seen in particular in FIG. 6. In this closed position of the valve element 16 no cooling liquid throughflow is possible between the cooling liquid connections 14, 12 of the housing 10.

Through a reduction of the applied vacuum of the vacuum drive 22 the drive rod 24 is forced out again from the housing of the vacuum drive 22 by the resetting spring 30 whereby the valve element 16 is rotated by way of the eccentric section 20 into the position illustrated in FIGS. 7 and 8 in which a partial, by way of example roughly half, congruence exists between the smaller opening 40 of the valve element 16 and the first cooling liquid connection 12 of the housing 10. In this position a cooling liquid throughflow between the cooling liquid connections 14, 12 of the housing 10 can thus take place, as can be seen in particular in FIG. 8.

Through renewed application of a vacuum through the vacuum drive 22 which leads to a drive force which is exerted by the drive rod 24 during the course of the retraction into the housing of the vacuum drive 22 and is below the predetermined limit force, the valve element 16 is then rotated into the intermediate position illustrated in FIGS. 9 and 10. The intermediate position is clearly defined by the actuating projection 38 stopping against the free end of the spring arm 36, as shown in FIG. 9. The drive force thereby exerted which is below the limit force is not sufficient to prestress the spring arm 36 through the actuating projection 38 out from the blocked position into the release position. As can be seen in FIG. 10, in this intermediate position no congruence is provided between the smaller opening 40 of the valve element 16 and the first cooling liquid connection 12. Nevertheless in this intermediate position of the valve element 16 a small cooling liquid throughflow between the cooling liquid connections 14, 12 of the housing 10 is possible, namely through the depression 48 which adjoins the opening 40. In this intermediate position a small cooling liquid throughflow is guaranteed which is sufficient to avoid undesired hotspots in the internal combustion engine and in order to reliably determine the temperature of the internal combustion engine by way of the temperature of the cooling liquid.

The flow chart in FIG. 11 diagrammatically illustrates the path of the vacuum applied by the vacuum drive 22, and the positions of the valve element reached hereby. With the so-called "0-vacuum", an ambient pressure (about 100 kPa) exists, the valve element is located in the connecting position. If a rising low pressure is applied then the drive rod 24 is drawn into the housing of the vacuum drive 22, as shown in FIG. 11 by the traction direction, until reaching the intermediate position. This can be achieved by way of example with an absolute pressure of about 65 kPa ("¾-vacuum"). Up to this vacuum the drive force is not sufficient to press the spring arm 36 through the actuating projection 38 into the released position. If a still higher vacuum is applied the prestress of the spring arm 36 is on the other hand overcome and the valve element 16 can be rotated into the closed position.

The invention claimed is:

1. A thermostat valve for an internal combustion engine, the thermostat valve comprising:
   a housing with a plurality of cooling liquid connections;
   a hollow valve element which is mounted rotatably in the housing; and
   a drive configured to drive the hollow valve element rotationally by a drive force,
   wherein
   the valve element has a plurality of openings on an outer face of the valve element and configured to be brought into and out of alignment selectively with one or more of the plurality of cooling liquid connections of the housing for the throughflow of cooling liquid by way of rotation of the valve element,
   adjacently with respect to one of the plurality of openings, the outer face of the valve element has a depression or a cutout,
   the valve element is rotatable to assume a connecting position, a closed position, and an intermediate position between the connecting position and the closed position,
   in the connecting position, a relevant opening of the plurality of openings is in alignment with a relevant cooling liquid connection of the plurality of cooling liquid connections of the housing and a cooling liquid flow is possible between an interior of the valve element and the relevant cooling liquid connection,
   in the closed position, the relevant opening is not in alignment with the relevant cooling liquid connection of the housing and a cooling liquid flow is not possible between the interior of the valve element and the relevant cooling liquid connection, in the intermediate position, the relevant opening is not in alignment with the relevant cooling liquid connection of the housing but a cooling liquid flow is possible between the interior of the valve element and the relevant cooling liquid connection through the depression or the cutout, the intermediate position is defined by a stop element which is prestressed into a blocked position and against which an actuating section of the valve element is stopped when the drive force does not exceed a limit force, and the stop element is moveable counter to its prestress by the actuating section of the valve element when the drive force exceeds the limit force, into a released position, in which the actuating section of the valve element is moveable past the stop element in order to leave the intermediate position, wherein the actuating section and the stop element are located outside of the housing.

2. The thermostat valve as claimed in claim 1, wherein the movement of the stop element counter to its prestress into the released position is effected by the actuating section of the valve element by way of the exertion of the drive force which exceeds the limit force during a rotation of the valve element out of the intermediate position into the closed position.

3. The thermostat valve as claimed in claim 1, wherein the connecting position and the closed position of the valve element are defined in each case by way of an end stop.

4. The thermostat valve as claimed in claim 1, wherein the stop element is spring-prestressed into the blocked position.

5. The thermostat valve as claimed in claim 4, wherein the stop element is an elastic spring arm which is clamped in fixedly with its one end, the actuating section moving in the blocked position against that free end of the spring arm which lies opposite the end which is clamped in fixedly.

6. The thermostat valve as claimed in claim 5, wherein the spring arm has, at its free end, a bent section, preferably a section which is bent in a V-shape, against which the actuating section moves.

7. The thermostat valve as claimed in claim 1, wherein the actuating section is an actuating projection which is formed on the outer side of the valve element.

8. The thermostat valve as claimed in claim 7, wherein the actuating section is formed at one end of a shaft which mounts the valve element rotationally.

9. The thermostat valve as claimed in claim 1, wherein the valve element is prestressed into the connecting position by way of spring prestress, with the result that the valve element assumes the connecting position if the drive fails.

10. The thermostat valve as claimed in claim 1, wherein the drive is a linear drive which acts eccentrically on a shaft which mounts the valve element rotationally.

11. The thermostat valve as claimed in claim 1, wherein the drive is a vacuum drive.

12. The thermostat valve as claimed in claim 1, wherein at least one of the plurality of cooling liquid connections has a sealing arrangement which comprises at least one sliding ring which is adapted to the outer face of the valve element and at least one elastic sealing ring which prestresses the sliding ring against the outer face of the valve element.

13. A method of operating a thermostat valve as claimed in claim 1, the method comprising:

rotating of the valve element out of the connecting position into the closed position by way of the drive force which exceeds the limit force, the valve element being moved with its actuating section past the stop element with movement of the stop element counter to its prestress into its released position, subsequent rotating of the valve element back out of the closed position beyond the intermediate position as far as into a position, in which the relevant opening of the valve element is in partial alignment with the relevant cooling liquid connection of the housing and a cooling liquid flow is possible between the interior of the valve element and the relevant cooling liquid connection, and then subsequent rotating of the valve element back into the intermediate position by way of the drive force which does not exceed the limit force, with the result that a cooling liquid flow takes place between the interior of the valve element and the relevant cooling liquid connection through the depression or the cutout.

14. A device, comprising:

a thermostat valve attached to an internal combustion engine, the thermostat valve including:

a housing with a plurality of cooling liquid connections;

a hollow valve element which is mounted rotatably in the housing; and a means for driving the hollow valve element rotationally by a drive force, wherein the valve element has a plurality of openings on an outer face of the valve element and configured to be brought into and out of alignment selectively with one or more of the plurality of cooling liquid connections of the housing for the throughflow of cooling liquid by way of rotation of the valve element, adjacently with respect to one of the plurality of openings, the outer face of the valve element has a depression or a cutout, the valve element is rotatable to assume a connecting position, a closed position, and an intermediate position between the connecting position and the closed position, in the connecting position, a relevant opening of the plurality of openings is in alignment with a relevant cooling liquid connection of the plurality of cooling liquid connections of the housing and a cooling liquid flow is possible between an interior of the valve element and the relevant cooling liquid connection, in the closed position, the relevant opening is not in alignment with the relevant cooling liquid connection of the housing and a cooling liquid flow is not possible between the interior of the valve element and the relevant cooling liquid connection, in the intermediate position, the relevant opening is not in alignment with the relevant cooling liquid connection of the housing but a cooling liquid flow is possible between the interior of the valve element and the relevant cooling liquid connection through the depression or the cutout, the intermediate position is defined by a movable stop element which is biased into a blocked position and against which an actuating section of the valve element is stopped when the drive force does not exceed a limit force, the stop element being biased via elasticity, the stop element is moveable via countering of the elasticity to counter to its bias by the actuating section of the valve element when the drive force exceeds the limit force, into a released position, in which the actuating section of the valve element is moveable past the stop element in order to leave the intermediate position, and the actuating section is formed at a portion of a shaft that, with respect to a length of the shaft, is located further from rather than closer to the housing, wherein the shaft mounts the valve element rotationally.

15. The thermostat valve as claimed in claim 1, wherein the actuating section is an actuating projection which is formed on the outer side of the valve element, and wherein the actuating section is formed adjacent one end of a shaft which mounts the valve element rotationally.

16. The thermostat valve as claimed in claim 1, wherein the actuating section is formed proximate one end of a shaft which mounts the valve element rotationally.

17. The thermostat valve as claimed in claim 1, wherein the actuating section is an actuating projection which is formed on the outer side of the valve element, and wherein the actuating section is formed at a portion of a shaft that, with respect to a length of the shaft, is located further from rather than closer to the housing, wherein the shaft mounts the valve element rotationally.

18. The thermostat valve as claimed in claim 1, wherein the valve is attached to a diesel engine.

19. The device as claimed in claim 14, wherein the plurality of openings are respectively uniform with respect to respective surfaces that establish the respective openings.

20. The device as claimed in claim 14, wherein the thermostat valve is configured such that the positions of the valve consist of the closed position, the intermediate position, and the connecting position.

* * * * *